United States Patent [19]

Von Haas

[11] Patent Number: 4,879,930

[45] Date of Patent: Nov. 14, 1989

[54] TOOL ARRANGEMENT HAVING ANGULAR POSITION FIXING MEANS

[75] Inventor: Rainer Von Haas, Geesthacht, Fed. Rep. of Germany

[73] Assignee: Fried. Krupp Gesellschaft mit beschränkter Haftung, Essen, Fed. Rep. of Germany

[21] Appl. No.: 207,012

[22] Filed: Jun. 15, 1988

[30] Foreign Application Priority Data

Jun. 26, 1987 [DE] Fed. Rep. of Germany ....... 3721158

[51] Int. Cl.[4] ........................ B23B 29/04; B23B 29/22

[52] U.S. Cl. ........................................ 82/158; 82/160; 279/1 A; 403/13; 407/82; 407/83; 407/101; 408/238; 408/239 A; 409/232; 409/234

[58] Field of Search .......................... 82/1.2, 36 R, 37; 279/1 A; 403/13, 14; 407/46, 81, 82, 83, 84, 101; 408/199, 238, 239 A; 409/232, 234

[56] References Cited

U.S. PATENT DOCUMENTS 1,633,239 6/1927 Blidsoe ................................ 407/84
3,304,837 2/1967 Perman .............................. 409/234
4,406,195 9/1983 Kruger et al. .................. 408/239 A
4,583,890 4/1986 Ewing et al. ................... 408/239 A
4,615,244 10/1986 Reiter et al. .................... 408/239 A
4,621,960 11/1986 Tollner ............................... 409/232

FOREIGN PATENT DOCUMENTS 1103723 3/1961 Fed. Rep. of Germany ... 408/239 A
3439040 4/1986 Fed. Rep. of Germany .
0224226 12/1984 Japan .................................. 409/234

*Primary Examiner*—Frederick R. Schmidt
*Assistant Examiner*—William E. Terrell
*Attorney, Agent, or Firm*—Spencer & Frank

[57] ABSTRACT

A rotationally symmetrical tool assembly includes a first component constituted by a tool holder; a second component constituted by a tool head and being removably attached to the first component such that engagement faces of the first and second components are in a contacting relationship with one another and are oriented perpendicularly to the rotary axis of the tool assembly. A fitting bore is provided in one of the components and a guide bore is provided in the other of the components. A securing pin projects from the fitting bore and extends into the guide bore for determining and maintaining a desired angular position of the second component relative to the first component. There are provided at least one additional fitting bore in one component and at least one additional guide bore in the other component, whereby the securing pin projecting from a selected one of the fitting bores is insertable to a selected one of the guide bores to provide for a selectable angular setting of the second component with respect to the first component. A plug is inserted in each guide bore other than the guide bore designated to receive the securing pin upon attaching the second component to the first component.

5 Claims, 1 Drawing Sheet

4 5 6 9 2
1
10
3
3a
A
4 8 7 10
7' 6 9

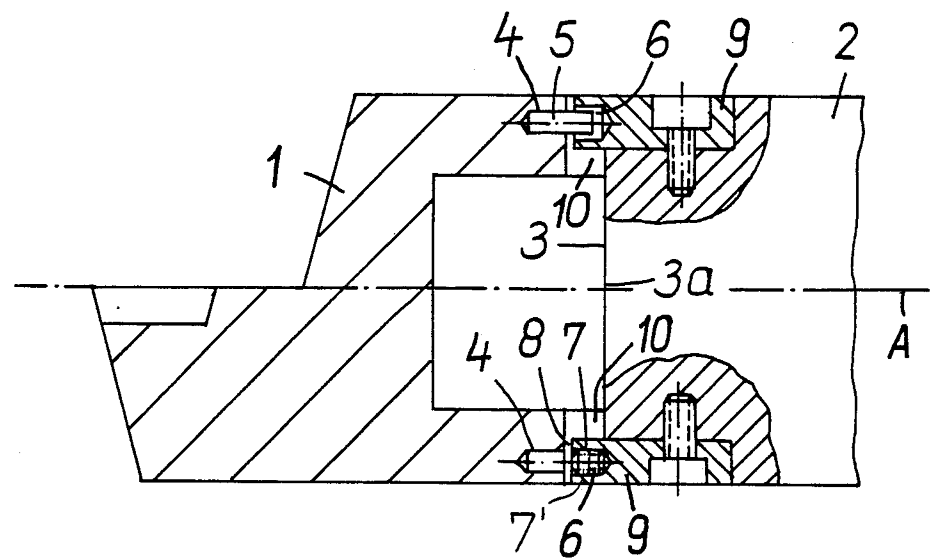
4
5
6
9
2
1
10
3
3a
4
8
7
10
A
7'
6
9

TOOL ARRANGEMENT HAVING ANGULAR POSITION FIXING MEANS

BACKGROUND OF THE INVENTION

The present invention relates to a tool arrangement having a tool head which can be fixed and securely maintained in a proper angular position relative to a tool holder.

Tool arrangements which have a rotationally symmetrical configuration are known. Tool heads of such systems can normally be inserted facing to the right or to the left, that is, there is a possibility of settings 180° apart. If the tool spindle rotates counterclockwise, for example, a left-hand tool head can be used for longitudinal turning in the direction of the spindle headstock. If the tool head is inserted into the basic tool holder after a 180° inversion and the spindle rotates clockwise, longitudinal turning is possible in the opposite direction, that is, toward the tailstock. To prevent the tool head from being clamped in the wrong angular position, it may be provided with a protruding pin which engages in a bore of the counterpiece when the head is attached thereto, but complete attachment is not possible if the head is in a 180° inverted orientation. It is also known to provide, for the same purpose, the pin in the tool holder and the bore in the tool head.

Securing devices of this type result in a tool head which cannot be used universally on both clockwise and counterclockwise rotating arrangements.

SUMMARY OF THE INVENTION

It is an object of the invention to provide a tool arrangement having a selectively fixed angular position which avoids the earlier-discussed disadvantage, but nevertheless ensures a correct mounting of the tool head.

This is accomplished according to the invention by a tool arrangement which has a tool holder component and an exchangeable tool head component. At least two fitting bores are provided in one of the components, one of the fitting bores being provided with a securing pin. At least two guide bores are provided in the other of the components. One of the guide bores receives the securing pin to fix the angular position of the tool head component. The remaining guide bores are closed off by plugs.

Thus, according to the invention, dependent upon the arrangement of the bores, the tool head can be selectively fixed in various angular positions and the correct angular position can be securely maintained by the securing pin. The guide bores may be disposed in either the tool head or the tool holder.

By proper positioning of the open guide bores, one tool head can then be mounted in different angular positions on different tool holders without changing the position of the securing pin. Also, by changing the position of the securing pin in the tool head, the angular position with respect to all holders is changed.

According to a preferred embodiment of the invention, the tool head and tool holder are equipped with a maximum of four bores. The fitting bores and guide bores each are disposed at diametrally equal distances from the axis of symmetry of the tool arrangement. With this arrangement, the tool head can be selectively inserted on the left or the right. If four bores are provided, the same tool head can be inserted on the right in one tool holder and on the left in a second tool holder without changing the position of the securing pin because the open guide bore in the tool holder is different in each case. To aid in the removal of the closing plugs it is particularly advantageous to equip each plug with an ejection thread as described e. g. in the German Offenlegungsschrift DE No. 34 39 040.

Various types of securing pins may be used, for example, mating pins, grooved pins, dowel pins or threaded pins. Except in the case of the threaded pins, the pins are securely seated by press fitting such that they can be removed and reinserted many times. Threaded pins can be secured against inadvertent outward travel by means of a plastic or an adhesive.

According to a further feature of the invention, mating springs and disc springs equipped with appropriate grooves can also be employed instead of the pins and their corresponding bores. The plugs must then be adapted to the dimensions of the grooves.

In automatic machine tools, the correct installation of the tool head can be monitored with the aid of sensors. These sensors indicate when the distance between the contact faces is, for example, less than 0.2 mm or equals 0 mm. This initiates the clamping process and, if the installation is incorrect, no clamping and start-up of the machine will take place.

BRIEF DESCRIPTION OF THE DRAWING

The sole FIGURE is a schematic sectional side elevational view of a tool head and a tool holder according to a preferred embodiment of the invention.

DESCRIPTION OF THE PREFERRED EMBODIMENT

Turning now to the FIGURE, there is shown a tool head 1 having two fitting bores 4, one of which is provided with a pin 5, and a tool holder 2 having two guide bores 6, one of which is closed by a plug 7. The plug 7 has an ejection thread 7' into which, when the plug 7 is to be removed from the guide bore 6, a correspondingly threaded tool may be screwed for extracting the plug 7. The tool head 1 has an end face 3 which is in a face-to-face contacting engagement with an end face 3*a* of the tool holder 2. The assembly formed of the tool head 1 and the tool holder 2 has a symmetry axis A. The fitting bores 4 are disposed directly in the tool head 1, while tenon blocks 9 including guide bores 6 are screwed into the tool holder 2. The tenon blocks 9 project from the contact face 3*a* of the tool holder 2 while the tool head 1 is provided with mating detent grooves 10 at corresponding locations to accommodate the projecting portions of the tenon blocks 9. Therefore, joint face 8 between the fitting bore 4 and the guide bore 6 is not disposed in the same plane as the contact surfaces 3 and 3*a* of the tool head 1 and the tool holder 2. The two fitting bores 4 as well as the two guide bores 6 are situated at identical diametral distances from the symmetry axis A.

The present disclosure relates to the subject matter disclosed in the Federal Republic of Germany Application No. P 37 21 158.7 filed on June 26th, 1987. the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a rotationally symmetrical tool assembly having a rotary axis and including a first component constituted by a tool holder and having a first engagement face, a second component constituted by a tool head and having a second engagement face; said second component being removably attached to said first component such that said first and second engagement faces are in a contacting relationship with one another and are oriented perpendicularly to said rotary axis; a fitting bore provided in one of said components; a guide bore provided in the other of said components; said fitting bore and said guide bore being oriented towards one another; and a securing pin projecting from said fitting bore and extending into said guide bore for determining and maintaining a desired angular position of said second component relative to said first component; the improvement comprising (a) at least one additional fitting bore provided in said one of said components and at least one additional guide bore provided in said other of said components, whereby the securing pin projecting from a selected one of said fitting bores is insertable to a selected one of said guide bores to provide for a selectable angular setting of said second component with respect to said first component; and (b) a plug inserted in each said guide bore other than the guide bore designated to receive said securing pin upon attaching said second component to said first component for preventing said securing pin from being received by the guide bore containing said plug; said plug remaining externally of any of the fitting bores when the first and second components are in an attached state with respect to one another.

2. A tool assembly as defined in claim 1, wherein the total number of said fitting bores and said guide bores is two each; said guide bores being arranged in two pairs each formed of one of said fitting bores and one of said guide bores; and further wherein the fitting bores and the guide bores being arranged at identical diametral distances from said rotary axis.

3. A tool assembly as defined in claim 1, further wherein each said plug comprises an ejection thread to aid in removal of said plugs from respective said guide bores.

4. A tool assembly as defined in claim 1, further comprising tenon blocks provided on one of said components; said tenon blocks being provided with the bores of the lastnamed one of said components.

5. A tool assembly as defined in claim 1, wherein butt joints are defined between said guide bores and said fitting bores aligned therewith when said components are connected; and further wherein said butt joints lie in a plane other than that defined by said first and second engagement faces.

* * * * *